(12) United States Patent
Mohammadpour et al.

(10) Patent No.: US 12,471,149 B2
(45) Date of Patent: Nov. 11, 2025

(54) METHOD FOR INITIAL ACCESS PROCEDURE

(71) Applicant: Nokia Technologies Oy, Espoo (FI)

(72) Inventors: Maryam Mohammadpour, Espoo (FI); Zexian Li, Espoo (FI)

(73) Assignee: Nokia Technologies Oy, Espoo (FI)

(*) Notice: Subject to any disclaimer, the term of this patent is extended or adjusted under 35 U.S.C. 154(b) by 303 days.

(21) Appl. No.: 18/487,620

(22) Filed: Oct. 16, 2023

(65) Prior Publication Data

US 2024/0172291 A1     May 23, 2024

(30) Foreign Application Priority Data

Nov. 23, 2022   (FI) .................................. 20226044

(51) Int. Cl.
*H04W 4/00*       (2018.01)
*H04W 74/00*      (2009.01)
(Continued)

(52) U.S. Cl.
CPC ..... *H04W 74/0833* (2013.01); *H04W 74/002* (2013.01); *H02J 50/001* (2020.01)

(58) Field of Classification Search
CPC ........... H04W 74/0833; H04W 74/002; H04W 72/23; H04W 72/0446; H04W 72/0453; H02J 50/001
See application file for complete search history.

(56) References Cited

U.S. PATENT DOCUMENTS 9,986,594 B2    5/2018  Goel et al.
10,298,557 B2   5/2019  Jeon et al.
(Continued)

FOREIGN PATENT DOCUMENTS

KR   20240168450 A  * 11/2024  ............. H04L 1/001
KR   20250034479 A  *  3/2025  ........ H04W 74/0838
(Continued)

OTHER PUBLICATIONS

"3rd Generation Partnership Project; Technical Specification Group Radio Access Network; NR; Radio Resource Control (RRC) protocol specification (Release 17)", 3GPP TS 38.331, V17.1.0, Jun. 2022, pp. 1-1273.
(Continued)

*Primary Examiner* — Thai Dinh Hoang
(74) *Attorney, Agent, or Firm* — Nokia Technologies Oy

(57) ABSTRACT

A method comprising: receiving, in an apparatus comprising a wirelessly chargeable power source or a power source with energy harvesting capability, a configuration message from a network node, said message comprising a first and a second random access (RA) resources, and a threshold value for selecting the first or the second RA resource based on an energy level of said power source; obtaining data to be transmitted to the network node; initiating an initial access procedure by sending the first RA resource and/or the data to the network node in response to the energy level being at least at the threshold value; or initiating the initial access procedure by sending the second RA resource to the network node in response to the energy level being below the threshold value; and entering, in response to sending the second RA resource, into an energy harvesting mode for charging said power source.

19 Claims, 6 Drawing Sheets

(51) Int. Cl.
*H04W 74/0833* (2024.01)
*H02J 50/00* (2016.01)

(56) References Cited

U.S. PATENT DOCUMENTS

| | | | |
|---|---|---|---|
| 10,631,266 | B2 | 4/2020 | Park et al. |
| 11,176,435 | B2 | 11/2021 | Elboim et al. |
| 11,381,110 | B1 | 7/2022 | Tanaka et al. |
| 11,394,246 | B2 * | 7/2022 | Shearer ............... H02J 50/90 |
| 2015/0303741 | A1 | 10/2015 | Malik et al. |
| 2019/0037605 | A1 | 1/2019 | Agiwal et al. |
| 2019/0074915 | A1 | 3/2019 | Greene et al. |
| 2020/0336015 | A1 | 10/2020 | Elliott et al. |
| 2020/0383143 | A1 * | 12/2020 | Lee ................... H04W 74/0816 |
| 2022/0167328 | A1 | 5/2022 | Xu et al. |
| 2024/0172291 | A1 * | 5/2024 | Mohammadpour ......................... H04W 74/0833 |

FOREIGN PATENT DOCUMENTS

| | | | | |
|---|---|---|---|---|
| WO | WO-2023167225 | A1 * | 9/2023 | ............ H02J 50/001 |
| WO | WO-2023177333 | A1 * | 9/2023 | ......... H04B 7/18513 |
| WO | WO-2023217773 | A1 * | 11/2023 | ............ H04W 48/20 |
| WO | WO-2024035327 | A1 * | 2/2024 | ........ H04W 52/0216 |
| WO | WO-2024093774 | A1 * | 5/2024 | ........... H04W 68/005 |
| WO | WO-2024095231 | A1 * | 5/2024 | ........... H04W 74/004 |
| WO | WO-2025082253 | A1 * | 4/2025 | ............ H04W 72/23 |
| WO | WO-2025102253 | A1 * | 5/2025 | ............ H04W 74/08 |
| WO | WO-2025175240 | A1 * | 8/2025 | ............ H02J 50/001 |

OTHER PUBLICATIONS

"3rd Generation Partnership Project; Technical Specification Group Radio Access Network; NR; Physical channels and modulation (Release 17)", 3GPP TS 38.211, V17.3.0, Sep. 2022, pp. 1-136.

"3rd Generation Partnership Project; Technical Specification Group Radio Access Network; NR; Physical layer procedures for control (Release 17)", 3GPP TS 38.213, V17.3.0, Sep. 2022, pp. 1-260.

"3rd Generation Partnership Project; Technical Specification Group Radio Access Network; NR; Medium Access Control (MAC) protocol specification (Release 17)", 3GPP TS 38.321, V17.1.0, Jun. 2022, pp. 1-241.

"3rd Generation Partnership Project; Technical Specification Group Services and System Aspects; Study on Ambient power-enabled Internet of Things (Release 19)", 3GPP TR 22.840, V0.2.0, Sep. 2022, pp. 1-60.

"New SID: Study on Ambient IoT", 3GPP TSG RAN#97e, RP-222685, Agenda: 9.1, Huawei, Sep. 12-16, 2022, 5 pages.

Harwahyu et al., "Conserving RACH Energy Usage with Flexible Preamble Allocation for IoT Coexisting with H2H Services", 16th International Conference on Quality in Research (QIR): International Symposium on Electrical and Computer Engineering, Jul. 22-24, 2019, 6 pages.

Xiao-Qing et al., "Micro-scale RF Energy Harvesting and Power Management for Passive IoT Devices", IEEE 2nd International Conference on Renewable Energy and Power Engineering (REPE), Nov. 2-4, 2019, pp. 54-58.

Office action received for corresponding Finnish Patent Application No. 20226044, dated May 24, 2023, 11 pages.

\* cited by examiner

METHOD FOR INITIAL ACCESS PROCEDURE

RELATED APPLICATION

This application was originally filed as a Finnish patent application no. 20226044, on 23 Nov. 2022, which is hereby incorporated in its entirety.

TECHNICAL FIELD

The present invention relates to initial access procedure applicable, for example, to Internet of Things (IoT) devices.

BACKGROUND

The Internet of Things (IoT) may be defined, for example, as an interconnection of uniquely identifiable embedded computing devices within the existing Internet infrastructure. IoT devices are implemented in various types of embedded systems, such as wireless sensor networks, control systems, home/building automation, etc., and they typically communicate with an access point using a wireless connection. An increased number of IoT devices are battery-less devices with no energy storage capability or devices with energy storage that do not need to be replaced or recharged manually.

Regarding the underlying network used for the wireless connection, the data traffic model between the IoT device and a network node, such as a base station (BS), for example in the $3^{rd}$ Generation Partnership Project (3GPP) networks, assumes that the data traffic can be originated and/or terminated at IoT device side. In other words, the initial data transmission can be triggered by the IoT device or the network node.

This may pose challenges for the devices with limited energy storage capability to carry out IoT device-initiated uplink (UL) data transmission efficiently. If the IoT device has insufficient stored energy to complete the entire UL data transmission, the IoT device may be only capable of delaying the UL data transmission until sufficient energy has been collected. This, in turn, will evidently lead to increased latency in transmission of the underlying application data.

Thus, there is a need for procedures to enable a IoT device to deliver the UL data so as to avoid introducing too long latency.

SUMMARY

Now, an improved method and technical equipment implementing the method has been invented, by which the above problems are alleviated. Various aspects include a method, an apparatus and a non-transitory computer readable medium comprising a computer program, or a signal stored therein, which are characterized by what is stated in the independent claims. Various details of the embodiments are disclosed in the dependent claims and in the corresponding images and description.

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, there is provided an apparatus comprising a wirelessly chargeable power source or a power source with energy harvesting capability; means for receiving a configuration message from a network node, said configuration message comprising a first random access (RA) resource and a second RA resource and a threshold value for selecting the first RA resource or the second RA resource based on an energy level of said power source; means for obtaining data to be transmitted to the network node; means for initiating an initial access procedure by sending the first RA resource and/or the data to the network node in response to the energy level of said power source being at least at the threshold value; means for initiating the initial access procedure by sending the second RA resource to the network node in response to the energy level of said power source being below the threshold value; and means for entering, in response to sending the second RA resource, into an energy harvesting mode for charging said power source.

According to an embodiment, the apparatus comprises means for sending a part of the data along the second RA resource.

According to an embodiment, the first random access (RA) resource and the second RA resource are a first random access (RA) preamble and a second RA preamble, correspondingly.

According to an embodiment, the first random access (RA) resource and the second RA resource are a first time/frequency resource for an uplink connection and a second time/frequency resource for an uplink connection, correspondingly.

According to an embodiment, said threshold value is determined based on a distance between the apparatus and the network node.

According to an embodiment, the apparatus comprises means for receiving the configuration message in a broadcast or a multicast message.

According to an embodiment, the apparatus comprises means for receiving the configuration message along radio resource configuration (RRC) signalling.

According to an embodiment, the apparatus comprises means for requesting a relay node to assist with the initial access procedure and/or data transmission.

According to an embodiment, the apparatus comprises means for receiving a signal from the network node or an external node indicated by the network node for harvesting energy from said signal for charging said power source; and means for continuing the initial access procedure and/or data transmission in response to the energy level of said power source reaching the threshold value.

A method according to a second aspect comprises: receiving, in an apparatus comprising a wirelessly chargeable power source or a power source with energy harvesting capability, a configuration message from a network node, said configuration message comprising a first random access (RA) resource and a second RA resource and a threshold value for selecting the first RA resource or the second RA resource based on an energy level of said power source; obtaining data to be transmitted to the network node; initiating an initial access procedure by sending the first RA resource and/or the data to the network node in response to the energy level of said power source being at least at the threshold value; or initiating the initial access procedure by sending the second RA resource to the network node in response to the energy level of said power source being below the threshold value; and entering, in response to sending the second RA resource, into an energy harvesting mode for charging said power source.

An apparatus according to a second aspect comprises: means for sending a configuration message to a second apparatus, said configuration message comprising a first random access (RA) resource and a second RA resource and a threshold value for selecting the first RA resource or the second RA resource based on an energy level of a power source of the second apparatus; means receiving, from the second apparatus, as an initial access procedure either: the first RA resource and/or data; or the second RA resource; and means for providing, in response to receiving the second RA resource, assistance for the second apparatus for charging said power source.

According to an embodiment, the apparatus comprises means for receiving a part of the data along the second RA resource.

According to an embodiment, the first random access (RA) resource and the second RA resource are a first random access (RA) preamble and a second RA preamble, correspondingly.

According to an embodiment, the first random access (RA) resource and the second RA resource are a first time/frequency resource for an uplink connection and a second time/frequency resource for an uplink connection, correspondingly.

According to an embodiment, said threshold value is determined based on a distance between the apparatus and the second apparatus.

According to an embodiment, the apparatus comprises means for sending the configuration message in a broadcast message.

According to an embodiment, the apparatus comprises means for sending the configuration message along radio resource configuration (RRC) signalling.

According to an embodiment, the apparatus comprises means for indicating, to the second apparatus, a relay node to assist with the initial access procedure.

According to an embodiment, the apparatus comprises means for transmitting a signal to the second apparatus for harvesting energy from said signal for charging said power source.

According to a fourth aspect, there is provided a method comprising: sending a configuration message to an apparatus, said configuration message comprising a first random access (RA) resource and a second RA resource and a threshold value for selecting the first RA resource or the second RA resource based on an energy level of a power source of the apparatus; receiving, from the apparatus, as an initial access procedure either: the first RA resource and/or data; or the second RA resource; and providing, in response to receiving the second RA resource, assistance for the apparatus for charging said power source.

Computer readable storage media according to further aspects comprise code for use by an apparatus, which when executed by a processor, causes the apparatus to perform the above methods.

BRIEF DESCRIPTION OF THE DRAWINGS

For a more complete understanding of the example embodiments, reference is now made to the following descriptions taken in connection with the accompanying drawings in which.

DETAILED DESCRIPTION OF SOME EXAMPLE EMBODIMENTS

In recent years, supporting various Internet of Things (IoT) type of applications with advanced wireless technology has gained more and more interests from both academy and industry research. The Internet of Things (IoT) may be defined, for example, as an interconnection of uniquely identifiable embedded computing devices within the existing Internet infrastructure. To utilize the internet, IoT devices are provided with an addressable interface (e.g., an Internet protocol (IP) address, a Bluetooth identifier (ID), a near-field communication (NFC) ID, etc.) operating as a unique identifier. IoT devices can transmit information to one or more other devices over a wired or wireless connection.

The IoT devices may be classified into active IoT devices, which operate using their own power source, and passive IoT devices, which operate using wireless power transferred from an outside source. The passive IoT device may have a passive communication interface, such as a quick response (QR) code, an RFID tag or an NFC tag. However, when an IoT device with an RFID tag or an NFC tag includes its own power source, such as a battery, the IoT device may be classified as an active IoT device. The IoT devices may be provided with a radio communication functionality to wirelessly communicate with an external device, using a communication interface supporting, for example but not limiting to, a local area network (LAN), a WLAN such as Wi-Fi, a WPAN such as Bluetooth, a wireless USB, ZigBee, NFC, RFID, or a mobile cellular network. Interface supporting Bluetooth may support Bluetooth low energy (BLE). An IoT device capable of wireless communication via radio frequency (RF) transmission and/or reception may be referred to as tag UE (User Equipment). Alternatively, IoT devices may have access to an IP-based network via a wired network, such as an Ethernet-based network or a power-line connection (PLC).

Figure 1:
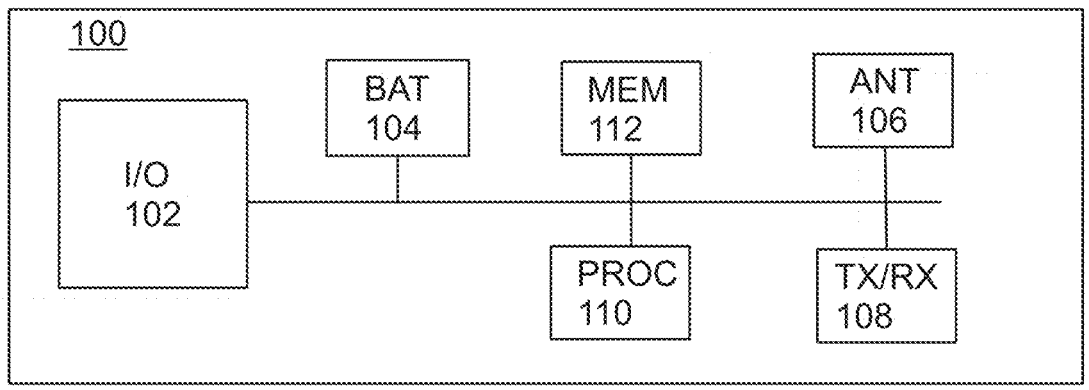
FIG. 1 shows an exemplified block chart of an IoT device.

FIG. 1 shows a generalized example of a block chart of an IoT device 100. At simplest, a passive IoT device may comprise only an I/O interface 102 enabling the passive IoT device to be connected and controlled within a IoT network. The I/O interface in the passive IoT device may include, for example, a barcode, Bluetooth interface, radio frequency (RF) interface, RFID tag, IR interface, NFC interface, or any other suitable I/O interface that can provide an identifier and attributes associated with the passive IoT device to another device when queried e.g. over a short-range interface.

An active IoT device is provided with a power source 104, such as a rechargeable or replaceable battery. Nevertheless, even a passive IoT device needs to temporarily store small amounts of energy for transmitting its identifier and attributes. For that purpose, the IoT device may have a circuitry comprising one or more capacitors operating as the power source 104, which may be charged with the needed energy.

The passive IoT device may obtain the needed energy from the RF signal received another device. The IoT device may also comprise one antenna for receiving and transmitting data, such as identifier, attributes and application-related data, and one or more antennas for obtaining energy from RF signal(s). Obtaining the needed energy from RF signal(s) is one form of what is referred to as energy harvesting. Other forms of energy harvesting may include, for example, obtaining the needed energy from light signal(s) or from motion of the IoT device.

Thus, an IoT device may comprise one or more external antennas and/or one or more integrated antennas with the casing (all denoted by 106), including but not limited to Wi-Fi antennas, cellular antennas, satellite position system (SPS) antennas, etc.

An IoT device 100 may further include one or more transceivers 108 configured for wired and/or wireless communication functionally coupled to one or more processors 110. The processor 112 can execute application programming instructions stored in a memory 114 of the IoT device. The memory may include, but is not limited to, a read-only memory (ROM), a random-access memory (RAM), an electrically erasable programmable ROM (EEPROM), and/or flash cards.

Figure 2:
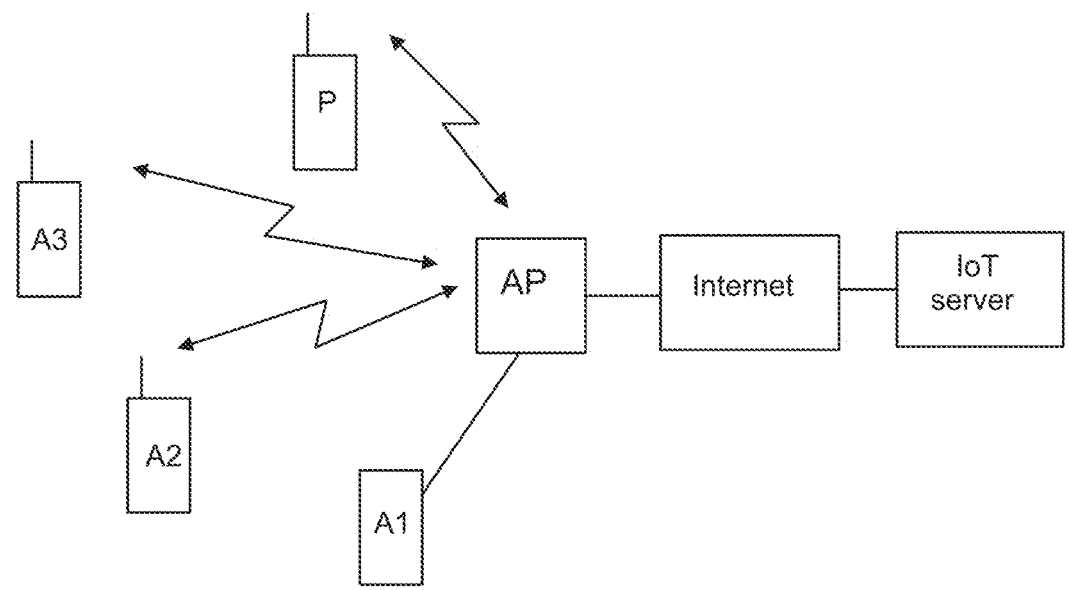
FIG. 2 shows a simplified example of a system comprising a plurality of IoT devices communicating with an access point.

FIG. 2 shows a simplified example of a system comprising a plurality of IoT devices communicating with an access point, such as a base station BS. The system is depicted as comprising a plurality of active IoT devices (A1, A2, A3) having a wireless connection (A2, A3) or a wired connection (A1) to an access point (AP). The system also comprises a passive IoT device (P) having a wireless connection to the access point (AP). The access point AP is connected to one or more IoT servers via Internet. The IoT server(s) may control or otherwise manage the attributes, activities, application data or states associated with the IoT devices.

It is noted that the network structure depicted in FIG. 2 is highly simplified. Especially the RF interface providing the wireless connection to the access point AP, and the underlying network structure towards the IoT server(s) may be very complicated. Along with the ever-increasing speed of the IoT devices spreading to be used in various industrial and commercial applications, it is evident that both the capacity and the latency of the underlying network structure may become bottlenecks in use of IoT technology. The new RF interface technologies introduced e.g. in 3GPP 5G/NR ($5^{th}$ Generation/New Radio) networks may provide a lucrative platform for IoT technology.

Thus, in the following, different exemplifying embodiments will be described using, as an example of an access architecture to which the embodiments may be applied, a radio access architecture based on Long Term Evolution Advanced (LTE Advanced, LTE-A) or new radio (NR, 5G), without restricting the embodiments to such an architecture, however. A person skilled in the art appreciates that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), the $5^{th}$ generation (5G) New Radio (NR), the future $6^{th}$ generation (6G) mobile telecommunication system, worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet protocol multimedia subsystems (IMS) or any combination thereof.

Figure 3:
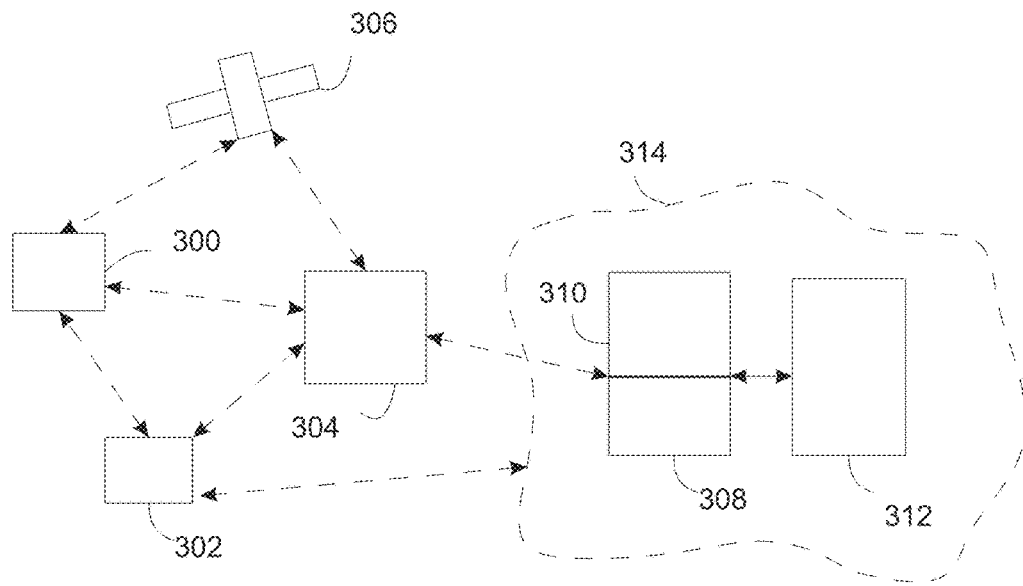
FIG. 3 shows a part of an exemplifying radio access network.

FIG. 3 depicts examples of simplified system architectures only showing some elements and functional entities, all being logical units, whose implementation may differ from what is shown. The connections shown in FIG. 3 are logical connections; the actual physical connections may be different. It is apparent to a person skilled in the art that the system typically comprises also other functions and structures than those shown in FIG. 3. The embodiments are not, however, restricted to the system given as an example but a person skilled in the art may apply the solution to other communication systems provided with necessary properties.

The example of FIG. 3 shows a part of an exemplifying radio access network.

FIG. 3 shows user devices 300 and 302 configured to be in a wireless connection on one or more communication channels in a cell with an access node (such as (e/g)NodeB) 304 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communication system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 310 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc. The CN may comprise network entities or nodes that may be referred to management entities. Examples of the network entities comprise at least an Access and Mobility Management Function (AMF).

The user device (also called a user equipment (UE), a user terminal, a terminal device, a wireless device, a mobile station (MS) etc.) illustrates one type of an apparatus to which resources on the air interface are allocated and assigned, and thus any feature described herein with a user device may be implemented with a corresponding network apparatus, such as a relay node, an eNB, and an gNB. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. Accordingly, the user device may be an IoT-device. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. The access nodes of the radio network form transmission/reception (TX/Rx) points (TRPs), and the UEs are expected to access networks of at least partly overlapping multi-TRPs, such as macro-cells, small cells, pico-cells, femto-cells, remote radio heads, relay nodes, etc. The access nodes may be provided with Massive MIMO antennas, i.e. very large antenna array consisting of e.g. hundreds of antenna elements, implemented in a single antenna panel or in a plurality of antenna panels, capable of using a plurality of simultaneous radio beams for communication with the UE. The UEs may be provided with MIMO antennas having an antenna array consisting of e.g. dozens of antenna elements, implemented in a single antenna panel or in a plurality of antenna panels. Thus, the UE may access one TRP using one beam, one TRP using a plurality of beams, a plurality of TRPs using one (common) beam or a plurality of TRPs using a plurality of beams.

5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

Frequency bands for 5G NR are separated into two frequency ranges: Frequency Range 1 (FR1) including sub-6 GHz frequency bands, i.e. bands traditionally used by previous standards, but also new bands extended to cover potential new spectrum offerings from 410 MHz to 7125 MHz, and Frequency Range 2 (FR2) including frequency bands from 24.25 GHz to 52.6 GHz. Thus, FR2 includes the bands in the mmWave range, which due to their shorter range and higher available bandwidth require somewhat different approach in radio resource management compared to bands in the FR1.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 312, or utilize services provided by them. The communication network may also be able to support the usage of cloud services, for example at least part of core network operations may be carried out as a cloud service (this is depicted in FIG. 3 by "cloud" 314). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud RAN architecture enables RAN real time functions being carried out at the RAN side (in a distributed unit, DU)

and non-real time functions being carried out in a centralized manner (in a centralized unit, CU 308).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well. The gNB is a next generation Node B (or, new Node B) supporting the 5G network (i.e., the NR).

5G may also utilize non-terrestrial nodes 306, e.g. access nodes, to enhance or complement the coverage of 5G service, for example by providing backhauling, wireless access to wireless devices, service continuity for machine-to-machine (M2M) communication, service continuity for Internet of Things (IoT) devices, service continuity for passengers on board of vehicles, ensuring service availability for critical communications and/or ensuring service availability for future railway/maritime/aeronautical communications. The non-terrestrial nodes may have fixed positions with respect to the Earth surface or the non-terrestrial nodes may be mobile non-terrestrial nodes that may move with respect to the Earth surface. The non-terrestrial nodes may comprise satellites and/or HAPSs. Satellite communication may utilize geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node 304 or by a gNB located on-ground or in a satellite.

A person skilled in the art appreciates that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

The Radio Resource Control (RRC) protocol is used in various wireless communication systems for defining the air interface between the UE and a base station, such as eNB/gNB. This protocol is specified by 3GPP in in TS 36.331 for LTE and in TS 38.331 for 5G. In terms of the RRC, the UE may operate in LTE and in 5G in an idle mode or in a connected mode, wherein the radio resources available for the UE are dependent on the mode where the UE at present resides. In 5G, the UE may also operate in inactive mode. In the RRC idle mode, the UE has no connection for communication, but the UE is able to listen to page messages. In the RRC connected mode, the UE may operate in different states, such as CELL_DCH (Dedicated Channel), CELL_FACH (Forward Access Channel), CELL_PCH (Cell Paging Channel) and URA_PCH (URA Paging Channel). The UE may communicate with the eNB/gNB via various logical channels like Broadcast Control Channel (BCCH), Paging Control Channel (PCCH), Common Control Channel (CCCH), Dedicated Control Channel (DCCH), Dedicated Traffic Channel (DTCH).

The transitions between the states are controlled by a state machine of the RRC. When the UE is powered up, it is in a disconnected mode/idle mode. The UE may transit to RRC connected mode with an initial attach or with a connection establishment. If there is no activity from the UE for a short time, eNB/gNB may suspend its session by moving to RRC Inactive mode and can resume its session by moving to RRC connected mode. The UE can move to the RRC idle mode from the RRC connected mode or from the RRC inactive mode.

The actual user and control data from network to the UEs is transmitted via downlink physical channels, which in 5G include Physical downlink control channel (PDCCH) which carries the necessary downlink control information (DCI), Physical Downlink Shared Channel (PDSCH), which carries the user data and system information for user, and Physical broadcast channel (PBCH), which carries the necessary system information to enable a UE to access the 5G network.

The user and control data from UE to the network is transmitted via uplink physical channels, which in 5G include Physical Uplink Control Channel (PUCCH), which is used for uplink control information including HARQ feedback acknowledgments, scheduling request, and downlink channel-state information for link adaptation, Physical Uplink Shared Channel (PUSCH), which is used for uplink data transmission, and Physical Random Access Channel (PRACH), which is used by the UE to request connection setup referred to as random access.

An initial access procedure, a.k.a. an initial cell search procedure, is referred to as a Random Access (RA) procedure in 5G. The UE has to perform a random access procedure in order to establish uplink synchronization and RRC connection. It may take place, for example, upon device power up, initial access from RRC_IDLE mode, RRC Connection Re-establishment procedure, handover procedure, Scheduling Request (SR) failure and Beam failure recovery. Thereupon, the UE sends a RACH (Random Access Channel) message on PRACH and synchronizes with the cell.

There are two types of RACH procedures: Contention-based RACH Procedure (CBRA), and Contention-free RACH Procedure (CFRA).

In the Contention-based RA, the UE randomly selects the preamble out of 64 preambles defined for each time-frequency slot. This may lead to multiple UEs sending the PRACH with the same preamble id, causing a PRACH collision, also referred to as "Contention", to occur. In the Contention-free RA, the network, such as e/gNB, informs each UE of exactly when and which preamble indexes to be used for PRACH.

Most of the existing wireless communication devices are powered by a battery that needs to be replaced or recharged. The convergence of various technologies has and will enable many fields of embedded systems, such as wireless sensor networks, control systems, home/building automation, etc. to be included the Internet of Things (IoT). In such fields of technology, there is a growing need for IoT technologies supporting battery-less devices with no energy storage capability or devices with energy storage that do not need to be replaced or recharged manually.

Within 3GPP, related issues regarding the relevant use cases, traffic scenarios, key performance indicators (KPIs), etc. are initially addressed in TR 22.840. The considered devices cover both battery-less type of devices (purely passive IoT device) or devices with limited energy storage capability, and for both types, the energy can be provided from an external energy source, e.g. via radio wave harvesting, light, motion etc. Instead of a rechargeable/replaceable battery, the latter types of devices may be provided with e.g. one or more capacitors for storing the gathered energy. The latter types of devices are considered to belong to ambient IoT, which may also be considered a (sub)category of passive IoT.

3GPP TR 22.840 also identifies these two types of devices:
Pure battery-less devices with no energy storage capability at all, and completely dependent on the availability of an external source of energy
Devices with limited energy storage capability that do not need to be replaced or recharged manually.

Considering the data traffic model between the IoT device (e.g. tag UE) and a network node, such as a base station (BS), the assumption is that the data traffic can be originated and/or terminated at IoT device side. In other words, the initial data transmission can be triggered by the IoT device or the network node.

This poses challenges even for the devices with limited energy storage capability to carry out tag UE initiated uplink (UL) data transmission efficiently. More specifically, when there is uplink traffic coming to a transmission buffer of a tag UE, considering limited energy storage capability and the power consuming active RF components used in traditional IoT transmitters, the tag UE may be provided with or without sufficient energy to complete the entire UL data transmission procedure. There is no problem if there is sufficient energy at tag UE to complete the entire UL data transmission.

However, in the case of the tag UE having insufficient stored energy to complete the entire UL data transmission, the tag UE may be only capable of delaying the UL data transmission until sufficient energy has been collected. This, in turn, will evidently lead to increased latency. While latency may not be an important KPI for a passive IoT device, as such, in many cases it is nevertheless important for the underlying application to get the updated data, for example temperature, humidity, etc., in a timely manner. Increased latency raises the risk that the data may become obsolete after a certain time window, and in the worst case, the changing tendency of the data may not be correctly determined by the application.

Thus, there is a need for procedures to enable a tag UE delivering the UL data so as to avoid introducing too long latency.

In the following, an enhanced method for initial access procedure will be described in more detail, in accordance with various embodiments.

Figure 4:
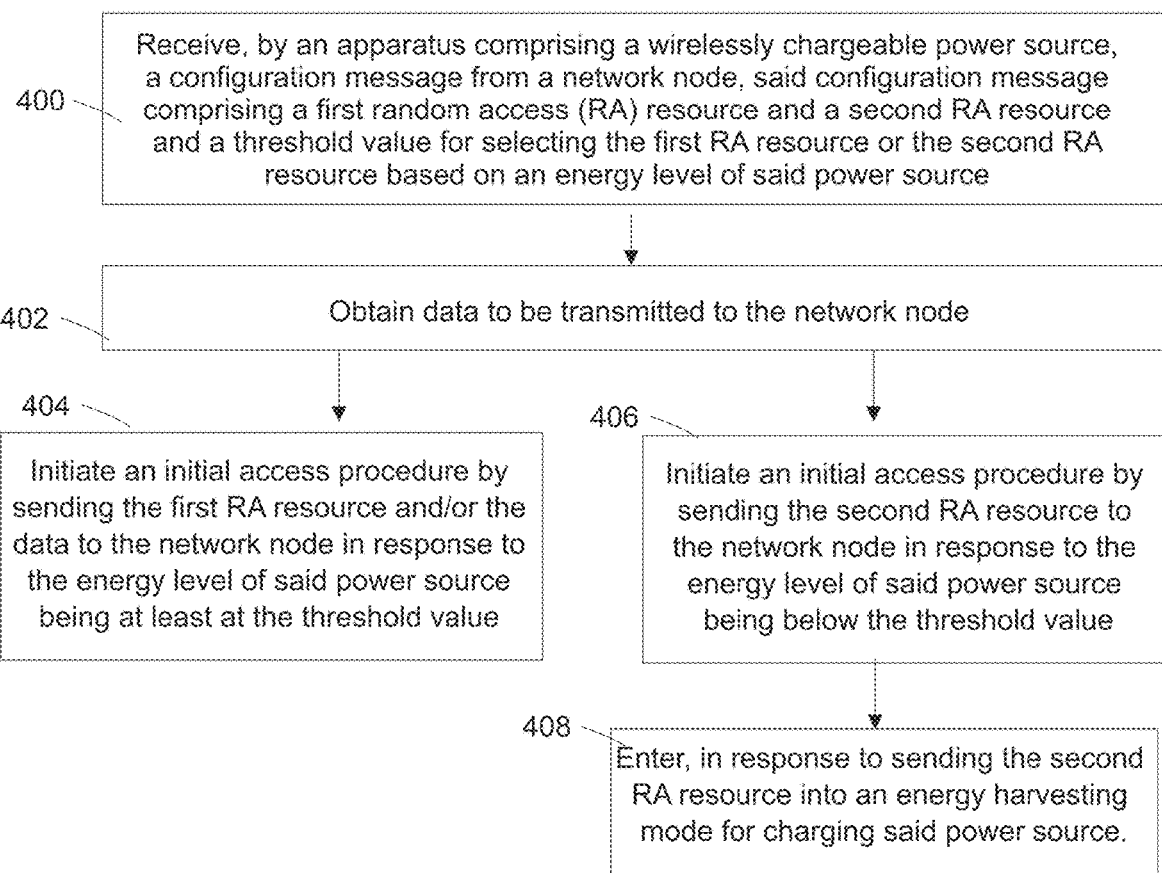
FIG. 4 shows a flow chart for initial access procedure carried out by an IoT device according to an embodiment.

The method, which is disclosed in flow chart of FIG. 4 as reflecting the operation of an apparatus, such as a tag UE or a passive IoT device, wherein the method comprises receiving (400), in an apparatus comprising a wirelessly chargeable power source or a power source with energy harvesting capability, a configuration message from a network node, said configuration message comprising a first random access (RA) resource and a second RA resource and a threshold value for selecting the first RA resource or the second RA resource based on an energy level of said power source; obtaining (402) data to be transmitted to the network node; initiating (404) an initial access procedure by sending the first RA resource and/or the data to the network node in response to the energy level of said power source being at least at the threshold value; or initiating (406) the initial access procedure by sending the second RA resource to the network node in response to the energy level of said power source being below the threshold value; and entering (408), in response to sending the second RA resource, into an energy harvesting mode for charging said power source.

According to an embodiment, the first random access (RA) resource and the second RA resource are a first random access (RA) preamble and a second RA preamble, correspondingly.

Thus, a fast initial access procedure and/or first data transmission of the passive IoT devices is facilitated by introducing two types of random access (RA) resources, such as preambles. Type 1 resource (e.g. Type 1 preamble) is used to indicate that the device has sufficient stored energy to complete the entire RA procedure and/or has sufficient energy to transmit the application data. The latter option refers to a possible forthcoming UL data transmission procedure for passive IoT type of devices, which may allow to report application data without going through the entire RA procedure. Type 2 resource (e.g. Type 2 preamble) is used to inform the network node, such as a BS, that more energy is needed to send the application data.

According to an embodiment, the first random access (RA) resource and the second RA resource are a first time/frequency resource for an uplink connection and a second time/frequency resource for an uplink connection, correspondingly.

As another embodiment, the different RA resources for the passive IoT devices are distinguished in time and/or frequency domain. In other words, different time/frequency resources are configured for the passive IoT devices. Type 1 resource is used in a similar way as Type 1 preamble, i.e. indicating that the device has sufficient stored energy to complete the entire RA procedure and/or has sufficient energy to transmit the application data. Type 2 resource is used in a similar way as Type 2 preamble, i.e. to inform the network node, such as a BS, that more energy is needed to send the application data.

The tag UE/passive IoT device receives the preambles from the network node, such as the BS, in a configuration message together with a threshold value for an available energy level of the power source of the device. The passive IoT device uses the threshold value to determine the proper type of preamble to be used for an initial access procedure e.g. by comparing the threshold value and the available/stored energy in the power source of the device.

An arrival of application data or any other event may trigger the passive IoT device to perform initial access procedure. Thereupon, the tag UE/passive IoT device determines which type of preamble should be used for initial access/data transmission. Based on the type of the received preamble, the network node, such as the BS, will know whether the passive IoT device has sufficient energy or not to complete the RA procedure and/or perform data transmission, whereupon the BS may take action accordingly. In a case where the preamble indicates that no sufficient stored energy in the passive IoT device (Type 2 preamble), the tag UE/passive IoT device enters into energy harvesting mode for collecting energy to charge its power source. The BS, in turn, may take different actions for assisting the tag UE/passive IoT device to collect the required energy.

Consequently, Contention-free Random Access (CFRA) may be utilised herein, where the preambles, a.k.a. dedicated random access preambles, are allocated by the BS, such as the gNB. The CFRA is also known as the 3-step RACH procedure, comprising the steps of Random Access Preamble Assignment by the BS, Random Access Preamble Transmission (Msg1) by the UE and Random Access Response (Msg2) by the BS. Alternatively, the 2-step RACH procedure may be used here, wherein after receiving the dedicated Random Access Preamble from BS, the passive IoT device sends Random Access Preamble and UL PUSCH (MsgA) and the BS responds by sending Random Access Response (MsgB).

According to an embodiment, the method comprises sending a part of the data along the second RA preamble.

The tag UE/passive IoT device may send part of the data, such as application data obtained by a sensor of the tag UE/passive IoT device, along the second RA preamble to the BS. It may be used as an indication that the device has sufficient energy for completing the RA procedure or performing a small data transmission procedure but not enough energy to transmit the whole pending data, such as the next message.

Thus, there may be three options for the tag UE/passive IoT device to initiate the initial access procedure towards the network node, such as a BS, by sending
  Type 1 Preamble+Data;
  Type 2 Preamble+Data; or
  Type 2 Preamble only.
Accordingly, Type 1 preamble may be used, if it is possible to complete the RA procedure and/or perform data transmission procedure for both the current message and also the next message(s). Type 2 preamble is used for requesting energy harvest, but there can be two ways to send the Type 2 preamble. If the tag UE sends the Type 2 preamble with data, it means that the device has sufficient energy for completing the RA procedure or performing a small data transmission procedure but not enough energy to transmit the whole pending data, such as the next message. If the tag UE sends the Type 2 preamble only, it means that the tag UE does not have enough energy for any further message transmission.

According to an embodiment, said threshold value is determined based on a distance between the apparatus and the network node.

The network node, such as the BS, determines the threshold value, wherein the value may be based on a distance between the tag UE and the network node. Typically, the longer the distance, the higher is the demand for the energy to complete the transmissions, and therefore a higher threshold value should be applied. The threshold value may be determined e.g. based on the RSRP level received from the tag UE, and/or the size of the first packet.

It is noted that the method may also be implemented without any threshold value received from the network.

Thus, BS does not need to configure the threshold, but rather the UE determines whether it has sufficient energy to deliver the data packet. Then based on the available energy, the UE selects the corresponding preamble type for UL transmission.

According to an embodiment, the method comprises receiving a signal from the network node or an external node indicated by the network node for harvesting energy from said signal for charging said power source; and continuing the initial access procedure and/or data transmission in response to the energy level of said power source reaching the threshold value.

Hence, after sending the Type 2 preamble to the network node, thereby indicating to the network node, such as the BS, that the tag UE does not have sufficient energy to complete all forthcoming message transmission, the tag UE enters into an energy harvesting mode. Based on the received Type 2 preamble, the network node determines that the tag UE may need some help in energy harvesting. Thus, the network node, which may be e.g. a 5G gNB, may start to transmit a narrow beam focused towards said tag UE in order to let it harvest energy from the signal. Alternatively, the network node, such as a 5G gNB, may request another node locating or capable of moving in vicinity of the tag UE to provide assistance in energy harvesting. For example, the network node may request a mobile device, for example a drone, to move towards said tag UE and offer assistance. Once the tag UE has harvested enough energy so as to reach the threshold value, it may continue the initial access procedure and/or data transmission of the subsequent messages.

According to an embodiment, the method comprises requesting a relay node to assist with the initial access procedure and/or data transmission.

The tag UE may send a request to use a relay node, which could relay the messages relating to the initial access procedure and/or data transmission to the network node. Such relay node may preferably locate in vicinity of the tag UE, i.e. closer to the tag UE than the network node, whereupon less energy is required to transmit the messages to relay node than the network node. The tag UE may send the request, for example, as a short-range scanning, for example as a Bluetooth Low Energy (BLE) scanning procedure, to search for potential relay nodes in the vicinity of the tag UE. Alternatively, the tag UE may request the network node to indicate a relay node to be used. The network node may, for example, request a mobile device, such as a drone, to move towards said tag UE to operate as the relay node.

According to an embodiment, the method comprises receiving the configuration message in a broadcast or multicast message.

The network node, such as the BS, may deliver the configuration message to the passive IoT devices via a broadcast channel, for example, using a system information block (SIB) or DCI on the PDCCH or physical downlink shared channel (PDSCH).

According to an embodiment, the method comprises receiving the configuration message along radio resource configuration (RRC) signalling.

The tag UE may also receive the configuration message, especially the two types of preambles, as soon as the tag UE obtains access to the network. Thus, the configuration message may be delivered, and the Type 2 preamble can be configured at the tag UE via radio resource configuration (RRC) signalling. Thereafter, the tag UE may request assistance for energy harvesting at any time by sending the Type 2 preamble.

Figure 5:
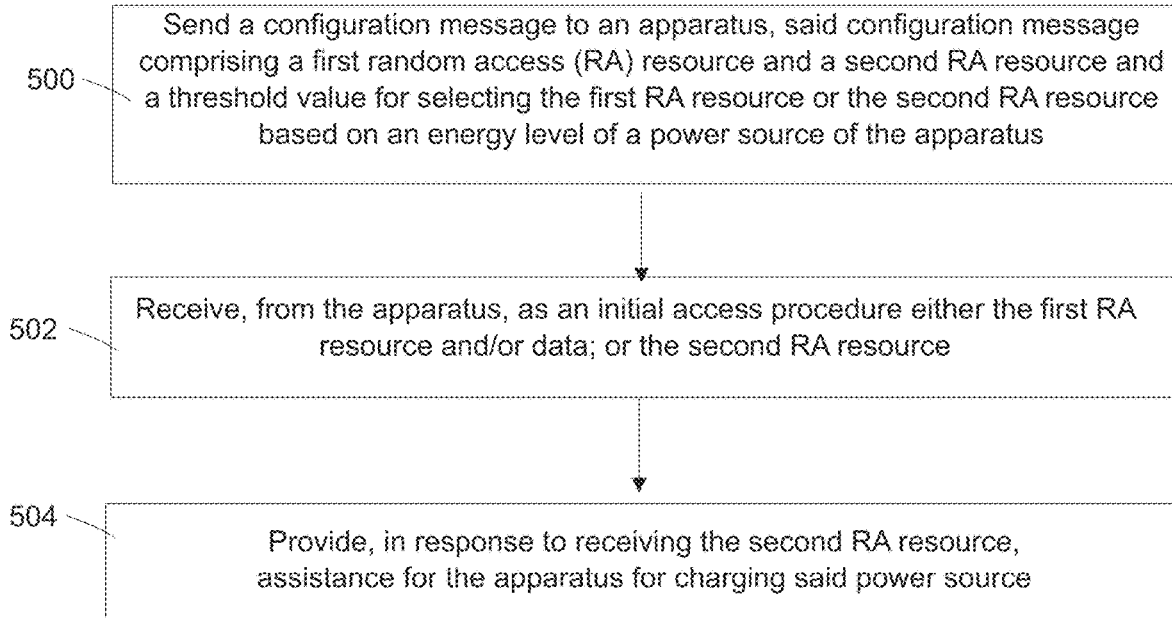
FIG. 5 shows a flow chart for initial access procedure carried out by a base station according to an embodiment.

Another aspect relates to the operation of the network node, for example a base station, such as e/gNB, which depicted in the flow chart of FIG. 5. The method comprises sending (500) a configuration message to an apparatus, said configuration message comprising a first random access (RA) resource and a second RA resource and a threshold value for selecting the first RA resource or the second RA resource based on an energy level of a power source of the apparatus; receiving (502), from the apparatus, as an initial access procedure either: the first RA resource and/or data; or the second RA resource; and providing (504), in response to receiving the second RA resource, assistance for the apparatus for charging said power source.

Some use case scenarios according to the embodiments are discussed below by referring to the signalling charts disclosed in FIGS. 6-8. In each use case, the first step (600, 700, 800) carried out by the base station is the same: the BS send a configuration message to the tag UE/passive IoT device, for example, via a broadcast or multicast channel, said message configuring the two types of preambles and the threshold value for an energy level of a power source of the tag UE/passive IoT device for the purpose of determining which preamble type should be sent once the UL access is triggered.

Figure 6:
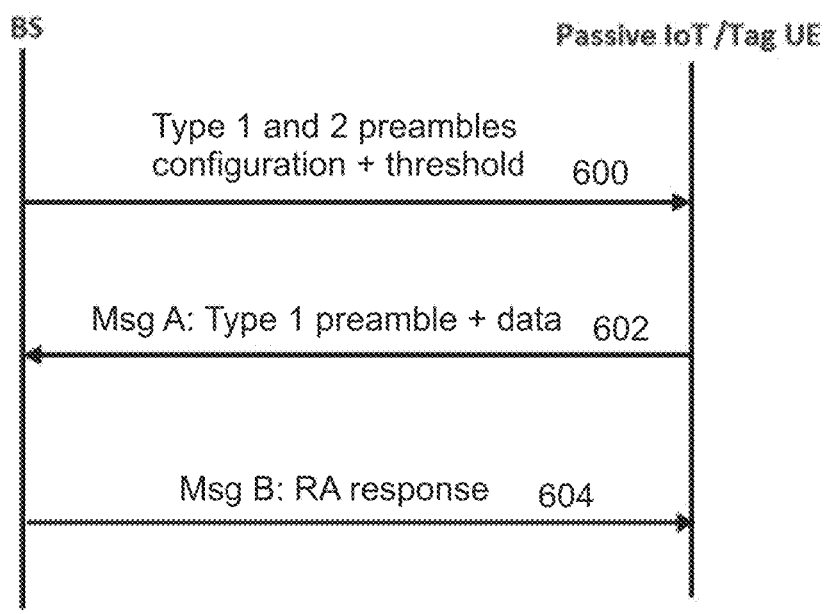
FIGS. 6-8 show signalling charts for some exemplified use case scenarios in the initial access procedure.

FIG. 6 shows a use case, where the stored energy level in the tag UE/passive IoT device is higher than, or at least equal to, the threshold value. In this case, the tag UE/passive IoT device may initiate, for example, 2-step RA procedure by sending (602) a MsgA provided with the Type 1 preamble and application data pending for uplink transmission. The base station acknowledges the RA procedure by sending (604) a MsgB RA response.

Figure 7:
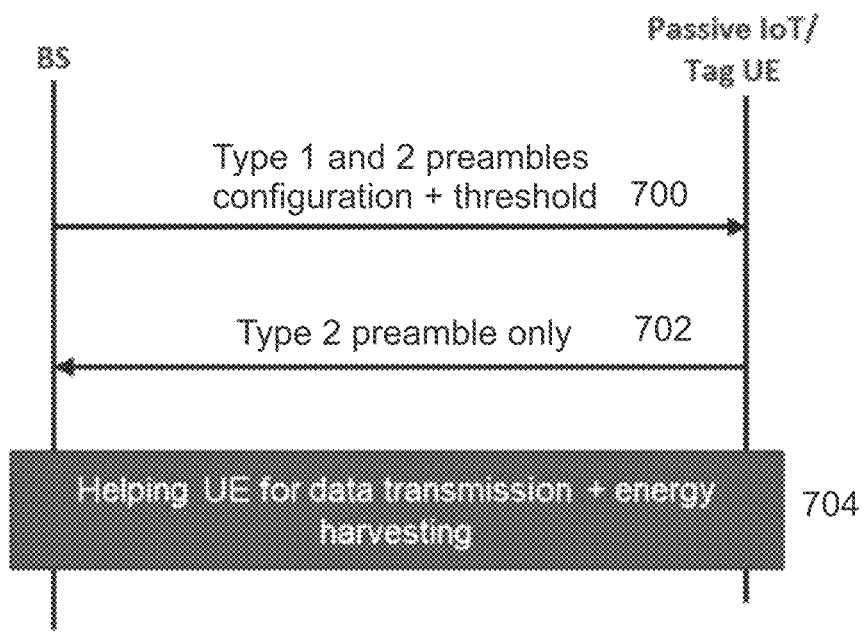

FIG. 7 shows a use case, where the stored energy level in the tag UE/passive IoT device is well below the threshold value. In this case, the tag UE/passive IoT device does not have enough energy to perform data transmission procedure even for the pending application data message. Therefore, the tag UE/passive IoT device sends (702) back the Type 2 preamble only. Now the base station may start actions (704) for helping the tag UE/passive IoT device to harvest more energy and/or to carry out the UL transmission, as described above.

Figure 8:
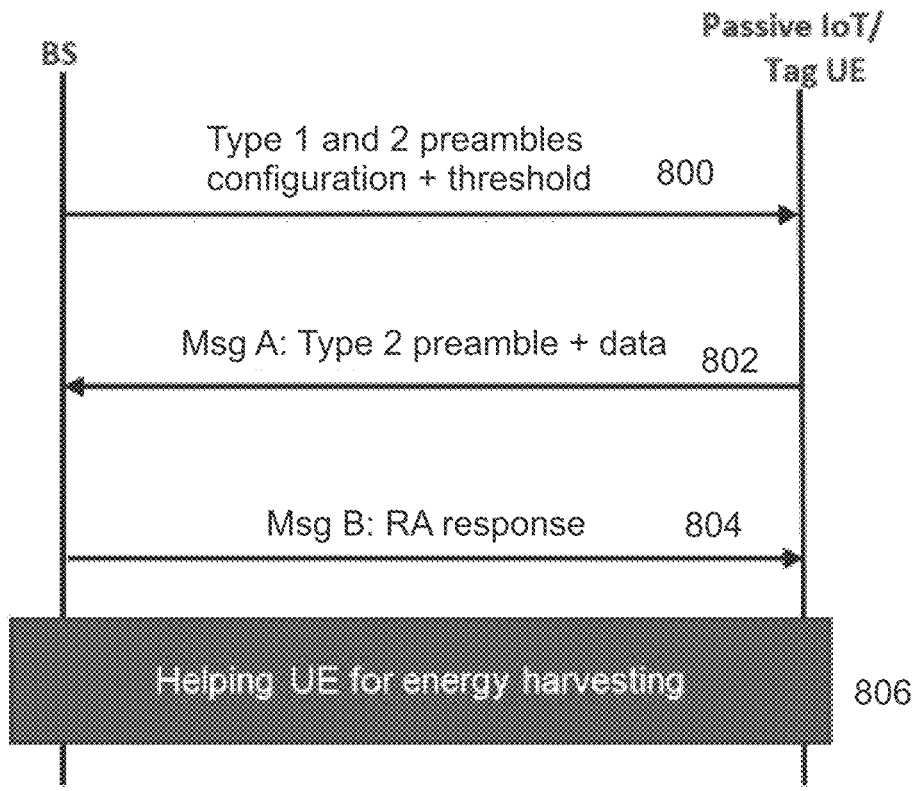

FIG. 8 shows a use case, where the stored energy level in the tag UE/passive IoT device is just below the threshold value. In this case, the tag UE/passive IoT device has enough energy initiate the RA procedure, but no enough to transmit all the pending application data. Therefore, the tag UE/passive IoT device sends (802) back a MsgA provided with the Type 2 preamble and a part of the application data pending for uplink transmission. The base station acknowledges the RA procedure by sending (804) a MsgB RA response. Nevertheless, based on the received Type 2 preamble, the base station knows that the stored energy level in the tag UE/passive IoT device is too low. Thus, the base station may start actions (806) for helping the tag UE/passive IoT device to harvest more energy and/or to carry out the UL transmission, as described above.

Figure 9:
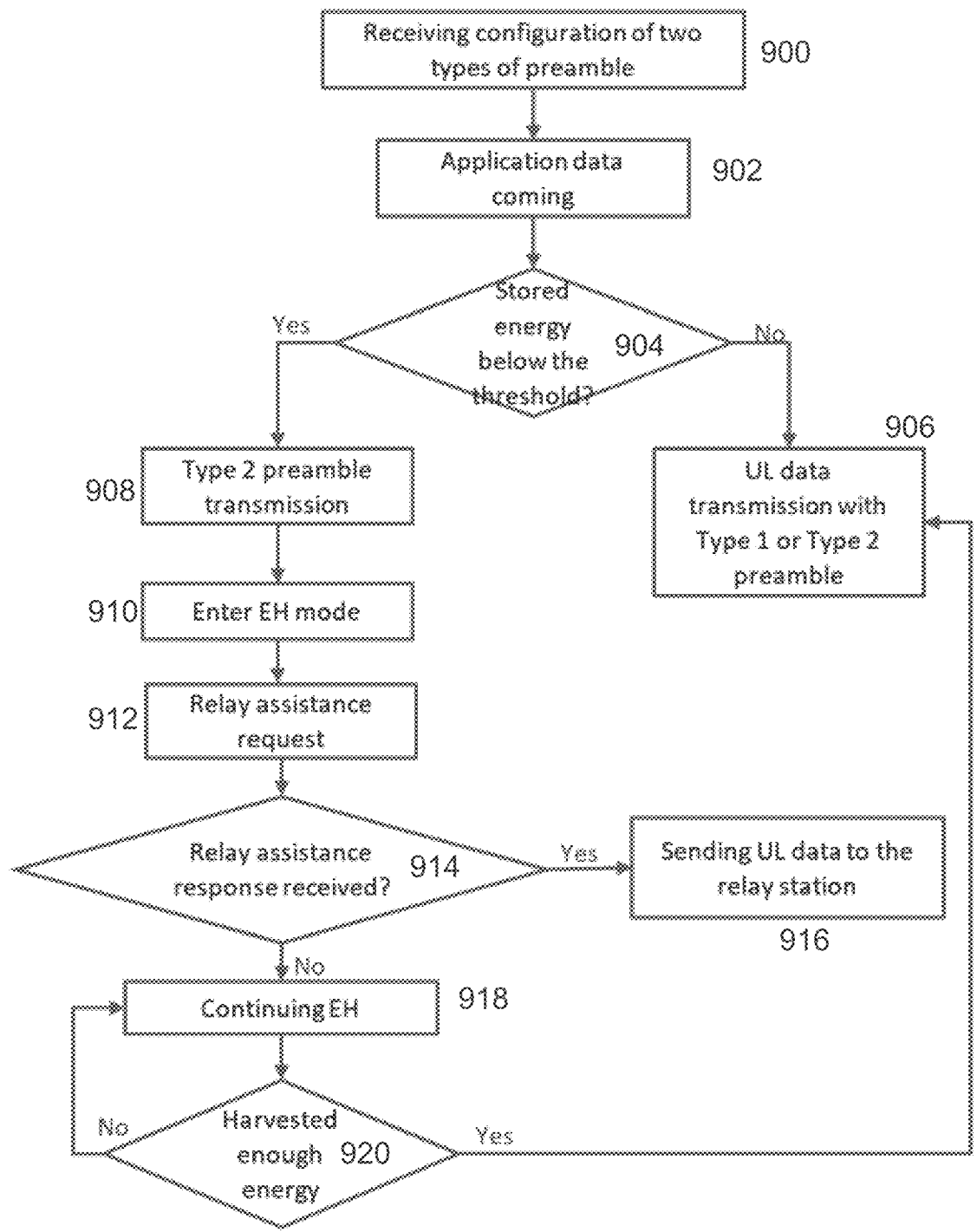
FIG. 9 shows a flow chart illustrates the operation of a tag UE/passive IoT device according to various embodiments.

The flow chart of FIG. 9 illustrates the operation of the tag UE/passive IoT device according to various embodiments. In the first step, the tag UE/passive IoT device receives (900) the two types of preambles from the network node, for example, in a configuration message together with a threshold value for an available energy level of the power source of the device. An arrival of application data (902) or any other event may trigger the passive IoT device to perform initial access procedure. The passive IoT device compares (904) the threshold value and the available/stored energy in the power source of the device and determines the proper type of preamble to be used for the initial access/data transmission. If the available/stored energy is above the threshold value, the tag UE/passive IoT device starts (906) the UL transmission by sending the Type 1 preamble to the network node.

However, if the available/stored energy is below the threshold value, the tag UE/passive IoT device sends (908) the Type 2 preamble to the network node and enters (910) into energy harvesting mode. Herein, according to an embodiment, the tag UE/passive IoT device may send (912) a request for relay assistance. The tag UE/passive IoT device monitors (914), if a relay assistance response is received, and if a suitable relay node is available, the tag UE/passive IoT device sends (916) the UL data to relay node. If no relay assistance response is received, the tag UE/passive IoT device continues (918) the energy harvesting until a sufficient energy level is reached (920) in the power source of the device. Then the tag UE/passive IoT device may continue (906) the UL transmission.

Figure 10:
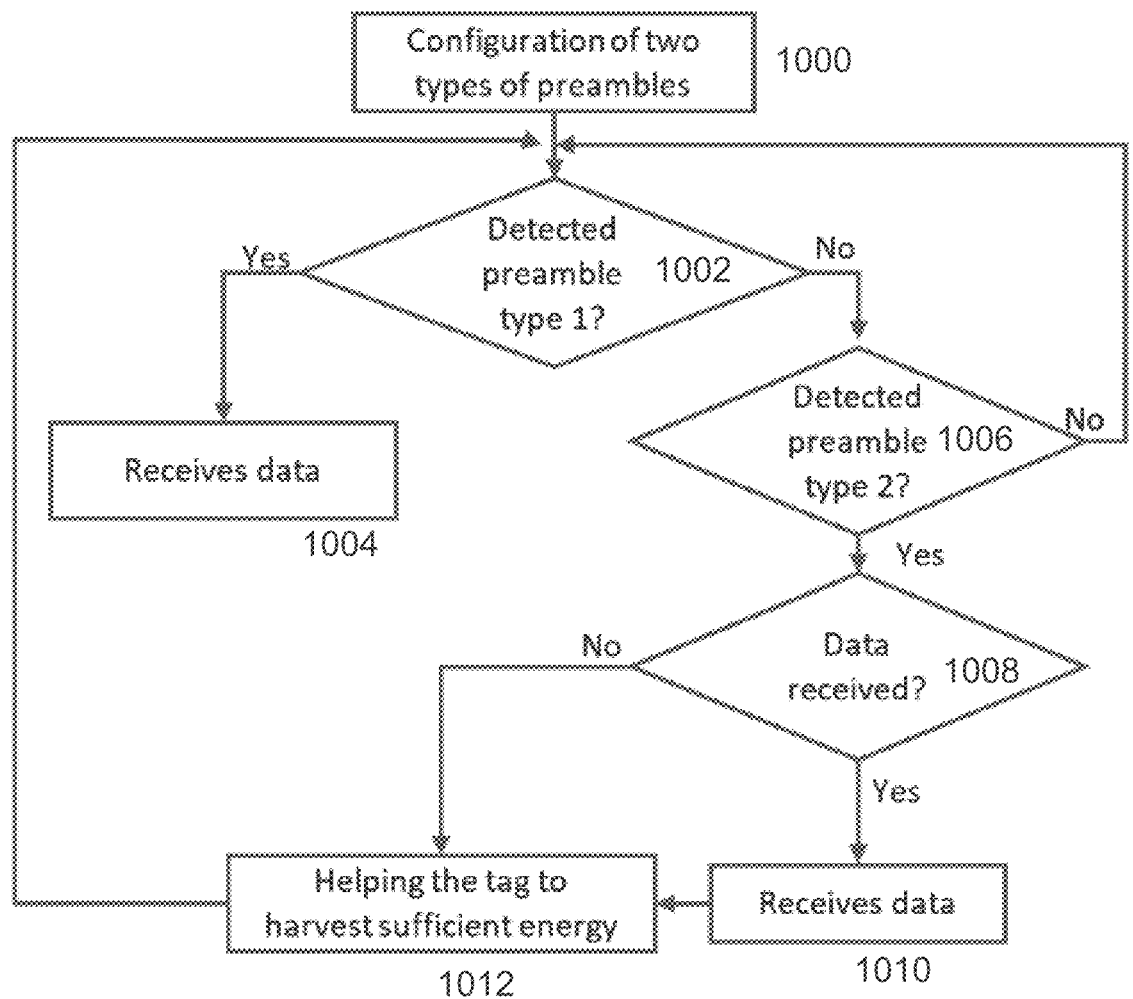
FIG. 10 shows a flow chart illustrates the operation of a base station according to various embodiments.

The flow chart of FIG. 10 illustrates the operation of the base station according to various embodiments. In the first step, the base station has provided (1000) the tag UE/passive IoT device with the two preambles. The base station monitors the UL transmission of the tag UE/passive IoT device and checks (1002), if the Type 1 preamble is detected. If yes, the UL transmission presumably includes application data, and the base station configures itself to receive (1004) the data. If no Type 1 preamble is detected, the base station checks (1006), if the Type 2 preamble is detected. If no, the base station continues to monitor the UL transmission.

If yes, the base station checks (1008), if the UL transmission includes also application data, whereupon the base station configures itself to receive (1010) the data. If no application data is received, but only the Type 2 preamble, the base station may start actions (1012) for helping the tag UE/passive IoT device to harvest more energy. This may also take place following the situation, where the Type 2 preamble was provided with application data and the base station has configured itself to receive (1010) the data.

The method and the embodiments related thereto may provide significant advantages. For example, enable the tag UE/passive IoT device may be able to avoid introducing long latency upon delivering the UL data. This, in turn, facilitates a fast initial access procedure and/or first data transmission of the tag UE/passive IoT device. Using two RA resource, such as two different preambles, for indicating the sufficiency of the energy level in the tag UE/passive IoT device enables to utilise a regular PRACH procedure for indicating the need for energy harvesting.

An apparatus, such as a UE, according to an aspect comprises a wirelessly chargeable power source or a power source with energy harvesting capability; means for receiving a configuration message from a network node, said configuration message comprising a first random access (RA) resource and a second RA resource and a threshold value for selecting the first RA resource or the second RA resource based on an energy level of said power source; means for obtaining data to be transmitted to the network node; means for initiating an initial access procedure by sending the first RA resource and/or the data to the network node in response to the energy level of said power source being at least at the threshold value; means for initiating the initial access procedure by sending the second RA resource to the network node in response to the energy level of said power source being below the threshold value; and means for entering, in response to sending the second RA resource, into an energy harvesting mode for charging said power source.

According to an embodiment, the apparatus comprises means for sending a part of the data along the second RA resource.

According to an embodiment, the first random access (RA) resource and the second RA resource are a first random access (RA) preamble and a second RA preamble, correspondingly.

According to an embodiment, the first random access (RA) resource and the second RA resource are a first time/frequency resource for an uplink connection and a second time/frequency resource for an uplink connection, correspondingly.

According to an embodiment, said threshold value is determined based on a distance between the apparatus and the network node.

According to an embodiment, the apparatus comprises means for receiving the configuration message in a broadcast or a multicast message.

According to an embodiment, the apparatus comprises means for receiving the configuration message along radio resource configuration (RRC) signalling.

According to an embodiment, the apparatus comprises means for requesting a relay node to assist with the initial access procedure and/or data transmission.

According to an embodiment, the apparatus comprises means for receiving a signal from the network node or an external node indicated by the network node for harvesting energy from said signal for charging said power source; and means for continuing the initial access procedure and/or data transmission in response to the energy level of said power source reaching the threshold value.

An apparatus according to a further aspect comprises a wirelessly chargeable power source or a power source with energy harvesting capability, at least one processor and at least one memory, said at least one memory stored with computer program code thereon, the at least one memory and the computer program code configured to, with the at least one processor, cause the apparatus at least to perform: receive a configuration message from a network node, said configuration message comprising a first random access (RA) resource and a second RA resource and a threshold value for selecting the first RA resource or the second RA resource based on an energy level of said power source; obtain data to be transmitted to the network node; initiate an initial access procedure by sending the first RA resource and/or the data to the network node in response to the energy level of said power source being at least at the threshold value; initiate the initial access procedure by sending the second RA resource to the network node in response to the energy level of said power source being below the threshold value; and enter, in response to sending the second RA resource, into an energy harvesting mode for charging said power source.

According to an embodiment, the apparatus comprises code configured to cause the apparatus to send a part of the data along the second RA resource.

According to an embodiment, the first random access (RA) resource and the second RA resource are a first random access (RA) preamble and a second RA preamble, correspondingly.

According to an embodiment, the first random access (RA) resource and the second RA resource are a first time/frequency resource for an uplink connection and a second time/frequency resource for an uplink connection, correspondingly.

According to an embodiment, said threshold value is determined based on a distance between the apparatus and the network node.

According to an embodiment, the apparatus comprises code configured to cause the apparatus to receive the configuration message in a broadcast or a multicast message.

According to an embodiment, the apparatus comprises code configured to cause the apparatus to receive the configuration message along radio resource configuration (RRC) signalling.

According to an embodiment, the apparatus comprises code configured to cause the apparatus to request a relay node to assist with the initial access procedure and/or data transmission.

According to an embodiment, the apparatus comprises code configured to cause the apparatus to receive a signal from the network node or an external node indicated by the network node for harvesting energy from said signal for charging said power source; and continue the initial access procedure and/or data transmission in response to the energy level of said power source reaching the threshold value.

An apparatus, i.e. a network node, such as a e/gNB, according to an aspect comprises: means for sending a configuration message to a second apparatus, said configuration message comprising a first random access (RA) resource and a second RA resource and a threshold value for selecting the first RA resource or the second RA resource based on an energy level of a power source of the second apparatus; means receiving, from the second apparatus, as an initial access procedure either: the first RA resource and/or data; or the second RA resource; and means for providing, in response to receiving the second RA resource, assistance for the second apparatus for charging said power source.

According to an embodiment, the apparatus comprises means for receiving a part of the data along the second RA resource.

According to an embodiment, the first random access (RA) resource and the second RA resource are a first random access (RA) preamble and a second RA preamble, correspondingly.

According to an embodiment, the first random access (RA) resource and the second RA resource are a first time/frequency resource for an uplink connection and a second time/frequency resource for an uplink connection, correspondingly.

According to an embodiment, said threshold value is determined based on a distance between the apparatus and the second apparatus.

According to an embodiment, the apparatus comprises means for sending the configuration message in a broadcast message.

According to an embodiment, the apparatus comprises means for sending the configuration message along radio resource configuration (RRC) signalling.

According to an embodiment, the apparatus comprises means for indicating, to the second apparatus, a relay node to assist with the initial access procedure.

According to an embodiment, the apparatus comprises means for transmitting a signal to the second apparatus for harvesting energy from said signal for charging said power source.

Such an apparatus may also be implemented as comprising at least one processor and at least one memory, said at least one memory stored with computer program code thereon, the at least one memory and the computer program code configured to, with the at least one processor, cause the apparatus at least to perform: send a configuration message to a second apparatus, said configuration message comprising a first random access (RA) resource and a second RA resource and a threshold value for selecting the first RA resource or the second RA resource based on an energy level of a power source of the second apparatus; receive, from the second apparatus, as an initial access procedure either: the first RA resource and/or data; or the second RA resource; and provide, in response to receiving the second RA resource, assistance for the second apparatus for charging said power source.

According to an embodiment, the apparatus comprises code configured to cause the apparatus to receive a part of the data along the second RA resource.

According to an embodiment, the first random access (RA) resource and the second RA resource are a first random access (RA) preamble and a second RA preamble, correspondingly.

According to an embodiment, the first random access (RA) resource and the second RA resource are a first time/frequency resource for an uplink connection and a second time/frequency resource for an uplink connection, correspondingly.

According to an embodiment, said threshold value is determined based on a distance between the apparatus and the second apparatus.

According to an embodiment, the apparatus comprises code configured to cause the apparatus to send the configuration message in a broadcast message.

According to an embodiment, the apparatus comprises code configured to cause the apparatus to send the configuration message along radio resource configuration (RRC) signalling.

According to an embodiment, the apparatus comprises code configured to cause the apparatus to indicate, to the second apparatus, a relay node to assist with the initial access procedure.

According to an embodiment, the apparatus comprises code configured to cause the apparatus to transmit a signal to the second apparatus for harvesting energy from said signal for charging said power source.

Such apparatuses may comprise e.g. the functional units disclosed in any of the FIGS. 1-3 for implementing the embodiments.

A further aspect relates to a computer program product, stored on a non-transitory memory medium, comprising computer program code, which when executed by at least one processor, causes an apparatus to perform: receive a configuration message from a network node, said configuration message comprising a first random access (RA) resource and a second RA resource and a threshold value for selecting the first RA resource or the second RA resource based on an energy level of a power source; obtain data to be transmitted to the network node; initiate an initial access procedure by sending the first RA resource and/or the data to the network node in response to the energy level of said power source being at least at the threshold value; initiate the initial access procedure by sending the second RA resource to the network node in response to the energy level of said power source being below the threshold value; and enter, in response to sending the second RA resource, into an energy harvesting mode for charging said power source.

A yet further aspect relates to a computer program product, stored on a non-transitory memory medium, comprising computer program code, which when executed by at least one processor, causes an apparatus to perform: send a configuration message to a second apparatus, said configuration message comprising a first random access (RA) resource and a second RA resource and a threshold value for selecting the first RA resource or the second RA resource based on an energy level of a power source of the second apparatus; receive, from the second apparatus, as an initial access procedure either: the first RA resource and/or data; or the second RA resource; and provide, in response to receiving the second RA resource, assistance for the second apparatus for charging said power source.

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended examples. However, all such and similar modifications of the teachings of this invention will still fall within the scope of this invention.

The invention claimed is:

1. An apparatus comprising:
a wirelessly chargeable power source or a power source with energy harvesting capability;
at least one processor and at least one memory, said at least one memory stored with computer program code thereon, the at least one memory and the computer program code configured to, with the at least one processor, cause the apparatus at least to perform:
receive a configuration message from a network node, said configuration message comprising a first random access (RA) resource and a second RA resource and a threshold value for selecting the first RA resource or the second RA resource based on an energy level of said power source;
obtain data to be transmitted to the network node;

initiate an initial access procedure by sending at least one of the first RA resource or the data to the network node in response to the energy level of said power source being at least at the threshold value;

initiate the initial access procedure by sending the second RA resource to the network node in response to the energy level of said power source being below the threshold value; and enter, in response to sending the second RA resource, into an energy harvesting mode for charging said power source.

2. The apparatus according to claim 1, wherein the apparatus is further caused to:

send a part of the data along the second RA resource.

3. The apparatus according to claim 1, wherein the first random access (RA) resource and the second RA resource are a first random access (RA) preamble and a second RA preamble, correspondingly.

4. The apparatus according to claim 1, wherein the first random access (RA) resource and the second RA resource are a first time/frequency resource for an uplink connection and a second time/frequency resource for an uplink connection, correspondingly.

5. The apparatus according to claim 1, wherein said threshold value is determined based on a distance between the apparatus and the network node.

6. The apparatus according to claim 1, wherein the apparatus is further caused to:

receive the configuration message in a broadcast or a multicast message.

7. The apparatus according to claim 1, wherein the apparatus is further caused to:

receive the configuration message along radio resource configuration (RRC) signalling.

8. The apparatus according to claim 1, wherein the apparatus is further caused to:

request a relay node to assist with at least one of the initial access procedure or data transmission.

9. The apparatus according to claim 1, wherein the apparatus is further caused to:

receive a signal from the network node or an external node indicated by the network node for harvesting energy from said signal for charging said power source; and continue at least one of the initial access procedure or data transmission in response to the energy level of said power source reaching the threshold value.

10. A method comprising:

receiving, in an apparatus comprising a wirelessly chargeable power source or a power source with energy harvesting capability, a configuration message from a network node, said configuration message comprising a first random access (RA) resource and a second RA resource and a threshold value for selecting the first RA resource or the second RA resource based on an energy level of said power source;

obtaining data to be transmitted to the network node;

initiating an initial access procedure by sending at least one of the first RA resource or the data to the network node in response to the energy level of said power source being at least at the threshold value; or initiating the initial access procedure by sending the second RA resource to the network node in response to the energy level of said power source being below the threshold value; and entering, in response to sending the second RA resource, into an energy harvesting mode for charging said power source.

11. An apparatus comprising:

at least one processor and at least one memory, said at least one memory stored with computer program code thereon, the at least one memory and the computer program code configured to, with the at least one processor, cause the apparatus at least to perform:

send a configuration message to a second apparatus, said configuration message comprising a first random access (RA) resource and a second RA resource and a threshold value for selecting the first RA resource or the second RA resource based on an energy level of a power source of the second apparatus;

receive, from the second apparatus, as an initial access procedure either:
at least one of the first RA resource or data; or
the second RA resource; and provide, in response to receiving the second RA resource, assistance for the second apparatus for charging said power source.

12. The apparatus according to claim 11, wherein the apparatus is further caused to:

receive a part of the data along the second RA resource.

13. The apparatus according to claim 11, wherein the first random access (RA) resource and the second RA resource are a first random access (RA) preamble and a second RA preamble, correspondingly.

14. The apparatus according to claim 11, wherein the first random access (RA) resource and the second RA resource are a first time/frequency resource for an uplink connection and a second time/frequency resource for an uplink connection, correspondingly.

15. The apparatus according to claim 11, wherein said threshold value is determined based on a distance between the apparatus and the second apparatus.

16. The apparatus according to claim 11, wherein the apparatus is further caused to:

send the configuration message in a broadcast message.

17. The apparatus according to claim 11, wherein the apparatus is further caused to:

send the configuration message along radio resource configuration (RRC) signalling.

18. The apparatus according to claim 11, wherein the apparatus is further caused to:

indicate, to the second apparatus, a relay node to assist with the initial access procedure.

19. The apparatus according to claim 11, wherein the apparatus is further caused to:

transmit a signal to the second apparatus for harvesting energy from said signal for charging said power source.

* * * * *